(12) United States Patent
Burch et al.

(10) Patent No.: US 10,070,586 B2
(45) Date of Patent: Sep. 11, 2018

(54) SUGARCANE FEED ROLLER STRUCTURE WITH SEALED COUPLING AND ASSOCIATED METHOD

(71) Applicant: Deere & Company, Moline, IL (US)

(72) Inventors: Guy Burch, Thibodaux, LA (US); Mark S. Louviere, Houma, LA (US); Blake C. Gettig, Thibodaux, LA (US)

(73) Assignee: DEERE & COMPANY, Moline, IL (US)

( * ) Notice: Subject to any disclaimer, the term of this patent is extended or adjusted under 35 U.S.C. 154(b) by 42 days.

(21) Appl. No.: 15/375,721

(22) Filed: Dec. 12, 2016

(65) Prior Publication Data

US 2018/0160626 A1    Jun. 14, 2018

(51) Int. Cl.
| | | |
|---|---|---|
| *A01D 61/00* | (2006.01) | |
| *A01D 69/00* | (2006.01) | |
| *A01D 51/00* | (2006.01) | |
| A01D 45/10 | (2006.01) | |

(52) U.S. Cl.
CPC ........... *A01D 61/008* (2013.01); *A01D 51/00* (2013.01); *A01D 69/00* (2013.01); *A01D 45/10* (2013.01)

(58) Field of Classification Search
CPC ........ A01D 51/00; A01D 61/00; A01D 69/00; A01D 61/008; A01D 45/10
USPC ............................................. 56/347; 460/114
See application file for complete search history.

(56) References Cited

U.S. PATENT DOCUMENTS

| | | | | |
|---|---|---|---|---|
| 4,897,986 | A * | 2/1990 | Baker | .................... A01D 45/10 384/537 |
| 7,089,897 | B2 * | 8/2006 | Schafer | .................... F01L 1/352 123/90.11 |
| 8,240,115 | B2 | 8/2012 | Marchini | |
| 9,433,149 | B2 | 9/2016 | Mixon et al. | |
| 2015/0327437 | A1 | 11/2015 | Mixon et al. | |
| 2015/0331408 | A1 | 11/2015 | Richard | |

OTHER PUBLICATIONS

Sugarcane Harvester Feed Roller Image (prior art before Dec. 12, 2016).

* cited by examiner

*Primary Examiner* — John Weiss

(57) ABSTRACT

A sugarcane feed roller structure comprises a sugarcane feed roller, a motor, a coupling, and a seal. The coupling interconnects the motor and the sugarcane feed roller, and comprises a splined joint. The seal protects the splined joint. An associated method is disclosed.

8 Claims, 5 Drawing Sheets

SUGARCANE FEED ROLLER STRUCTURE WITH SEALED COUPLING AND ASSOCIATED METHOD

FIELD OF THE DISCLOSURE

The present disclosure relates to a sugarcane feed roller structure for the feed section of a sugarcane harvester.

BACKGROUND OF THE DISCLOSURE

A sugarcane harvester has a feed section for feeding a severed mat of sugarcane from a basecutter to a chopping section where the sugarcane stalk is cut into segments. The feed section has a plurality of feed rollers. Each (or a number) of the feed rollers is driven by a respective motor. A coupling interconnects the feed roller and the motor via a splined joint of the coupling. The coupling operates in severe operating conditions, involving, for example, crop material, dirt, and water (and resulting rust), which cause accelerated wear of the coupling. The coupling is typically replaced in 1000 hours of operation.

SUMMARY OF THE DISCLOSURE

According to an aspect of the present disclosure, a sugarcane feed roller structure comprises a sugarcane feed roller, a motor, a coupling, and a seal. The motor comprises a rotatable motor shaft. The coupling comprises a shaft coupler and a roller coupler. The shaft coupler is fixed to the motor shaft for rotation therewith. The roller coupler is fixed to the sugarcane feed roller. The shaft coupler and the roller coupler are arranged in splined engagement with one another so as to provide a splined joint for rotation of the sugarcane feed roller by the motor. The seal establishes a sealed connection between the shaft coupler and the roller coupler for protection of the splined joint. An associated method is disclosed.

The above and other features will become apparent from the following description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1:
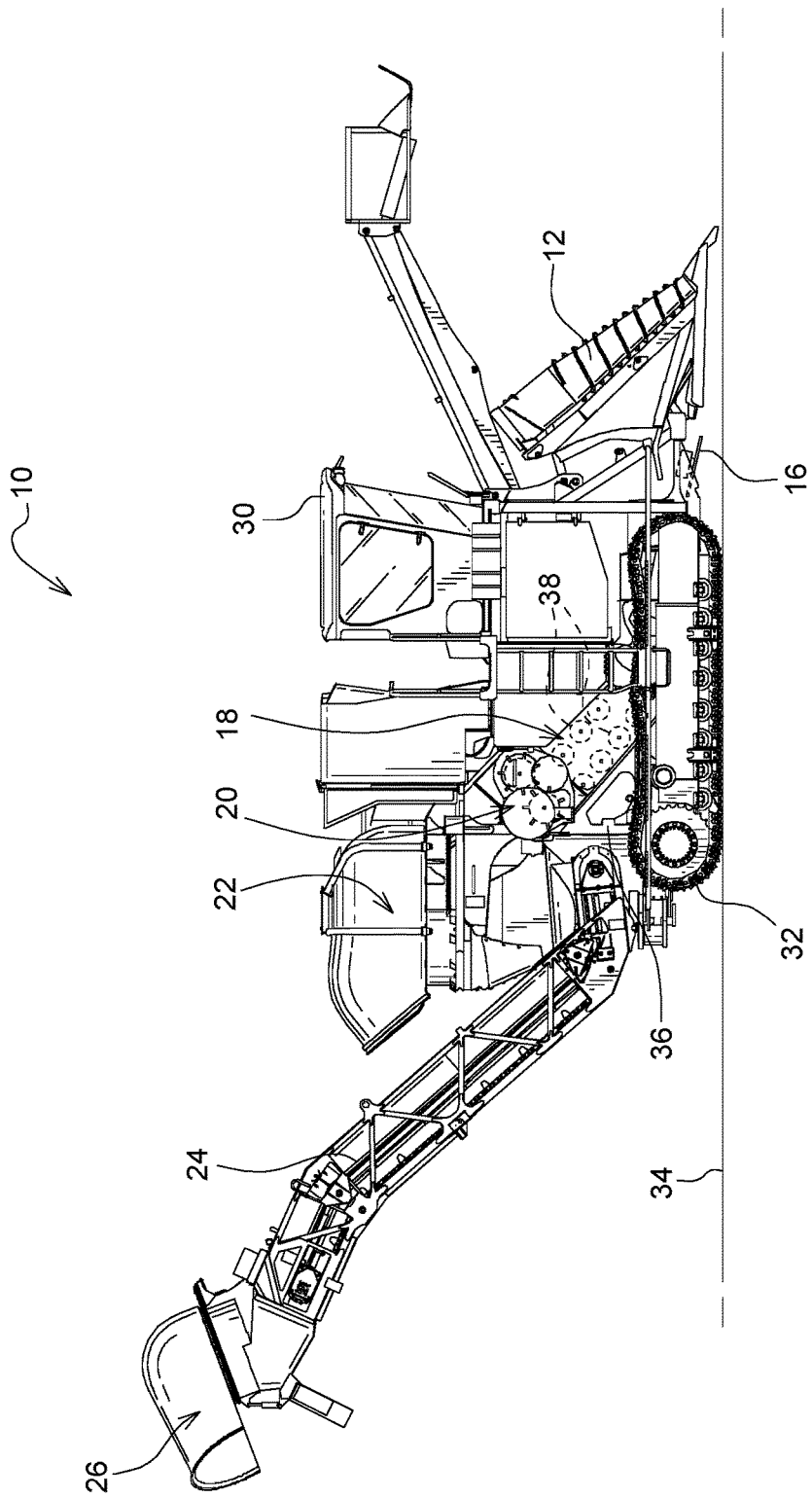
FIG. 1 is a side elevation view showing a sugarcane harvester.

Referring to FIG. 1, sugarcane harvester 10 is configured to harvest sugarcane. The harvester 10 comprises, for example, a left crop divider scroll 12 and a right crop divider scroll 12 (only the right crop divider scroll 12 being shown), an upper knockdown roller and a lower knockdown roller (the knockdown rollers not shown), a basecutter 16, a feed section 18, a chopping section 20, a primary extractor 22, an elevator 24, and a secondary extractor 26. The left and right crop divider scrolls 12 are configured to lift the sugarcane for feeding into the throat of the harvester 10. The basecutter 16 comprises a left cutting disk and a right cutting disk (only the right cutting disk being shown). The left and right cutting disks cooperate with one another to sever the stalk of sugarcane knocked down by the knockdown rollers at a location near the ground. The feed section 18 is configured to receive from the basecutter 16 a mat of severed sugarcane and to feed the mat rearwardly. The chopping section 20 is configured to receive the mat from the feed section 18 and cut the sugarcane stalk into billets. The primary extractor 22 is positioned downstream from the chopping section 20 and is configured to separate crop residue (e.g., leafy material) from the billets and remove the crop residue from the harvester 10. The elevator 24 is positioned at the rear of the harvester 10 to receive the cleaned flow of billets and is configured to convey the billets to an elevated position where they are discharged into a wagon to be hauled away. The secondary extractor 26 (if the harvester 10 has such an extractor 26) is positioned near the top of the elevator 24 and is configured to further separate crop residue from the billets and remove the crop residue from the harvester 10.

The harvester 10 comprises an operator's station 30 and traction elements 32. A human operator can operate the harvester 10 from the operator's station 30. The traction elements 32 are positioned on the left and right sides of the harvester 10 for engaging the ground 34 and propelling the harvester 10. Each traction element 32 may be, for example, a track unit or a ground-engaging wheel (e.g., there is one track unit on each side of the harvester 10 as shown, for example, with respect to the right side in FIG. 1).

Figure 2:
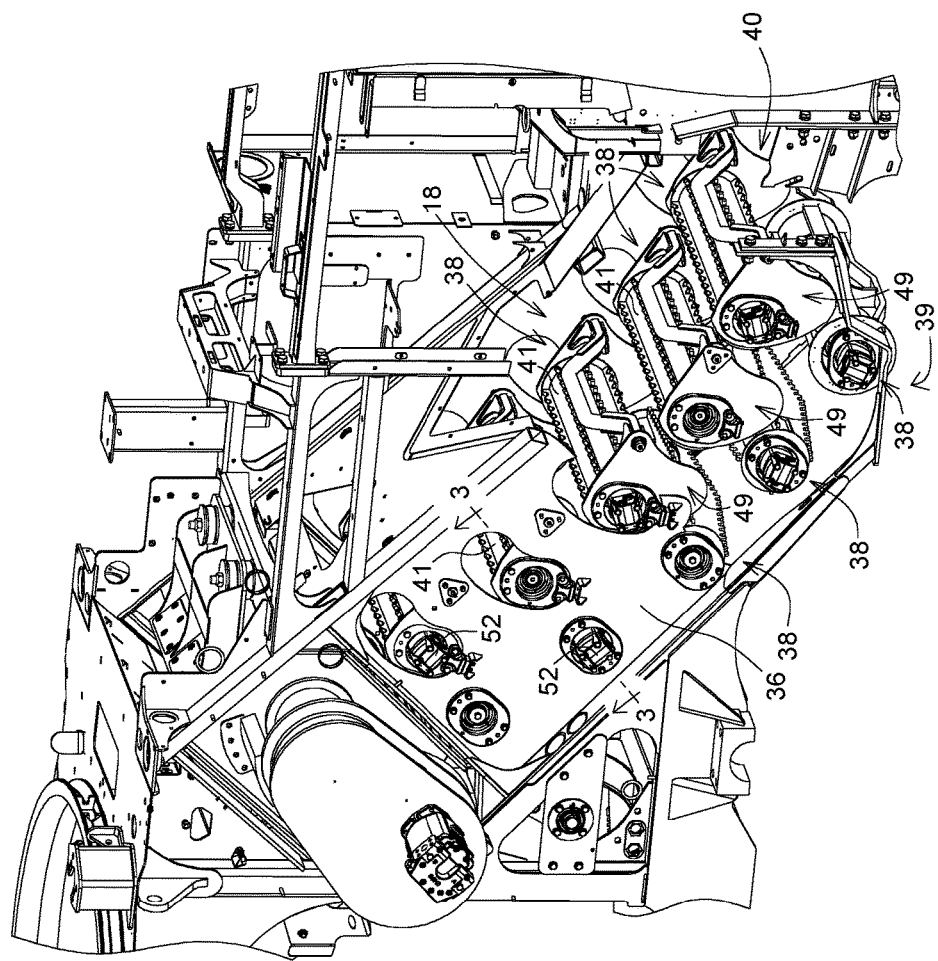
FIG. 2 is a perspective view, with portions broken away, showing a feed section of the sugarcane harvester.

Referring to FIG. 2, the feed section 18 comprises a frame 36 and sugarcane feed roller structures 38 mounted to the frame 36. The frame 36 is, for example, part of the main frame of the harvester 10. The structures 38 are arranged in a lower rank 39 of structures 38 and an upper rank 40 of structures 38 (e.g., each rank having five structures 38). The structures 38 are driven to advance the mat of sugarcane stalk to the chopping section 20. The configuration of the structures 38 may vary depending, for example, on the position of a given structure 38 within the feed section 18. The same reference numbers are used herein for corresponding components, although the configuration of those corresponding components may differ.

Each structure 38 has a sugarcane feed roller 41 having an axis of rotation 42 about which the feed roller 41 is rotatable. With respect to the structures 38 of the lower rank 39, the structures 38 are mounted to the frame 36 such that the associated axes of rotation 42 are stationary relative to the frame 36.

The structures 38 of the upper rank 40 are pivotally coupled to the frame 36 in order to pivot in response to the size of the mat passing between the upper and lower ranks. The structures 38 of the upper rank 40 are biased by gravity to assume their lowest position within their pivot range, and to pivot upwardly in response to larger mat sizes. As such, the axes of rotation 42 of the structures 38 of the upper rank 40 are pivotable relative to the frame 36.

Each structure 38 of the upper and lower ranks 39, 40 comprises a feed roller 41. The feed roller 41 is configured to engage the severed sugarcane (including stalk and leaves) and advance it toward the chopping section 20. The configuration of the feed roller 41 varies depending, for example, on the position of the feed roller 41 within the feed section 18. Nevertheless, as alluded to above, the same reference numbers are used herein for corresponding components.

Figure 3:
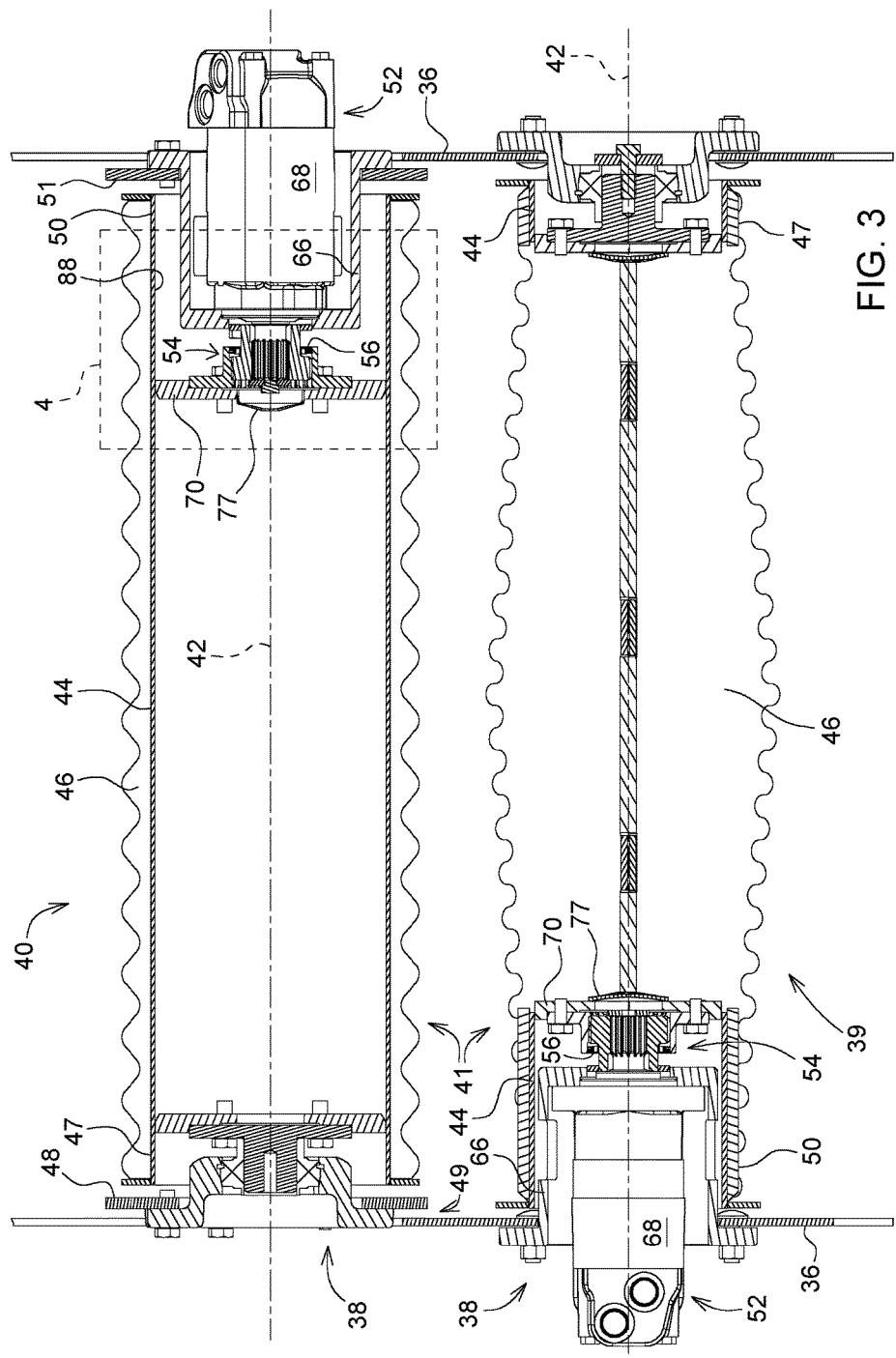
FIG. 3 is a sectional view, taken along lines 3-3 of FIG. 2, showing two sugarcane feed roller structures of the feed section, one included in an upper rank of sugarcane feed roller structures of the feed section and the other included in the lower rank of sugarcane feed roller structures of the feed section.

Referring to FIGS. 2 and 3, each feed roller 41 comprises at least one drum 44, rotatable about the axis of rotation 42 of the feed roller 41, and crop engagers 46. For example, each feed roller 41 of the upper rank 40 comprises a single, elongated drum 44 and crop engagers 46 in the form of teeth mounted to the exterior of the drum 44. Each of those rollers 41 has a number of axial rows of teeth spaced circumferentially about the drum 44 with uniform height profile, each row of teeth formed as a linear plate of teeth mounted to the drum 44 (e.g., welded).

Each of the feed rollers 41 of the lower rank 39 (starting from bottom right in FIG. 2) comprises two coaxial drums 44 shorter than the single, elongated drum 44 and spaced along the axis 42 so as to be positioned at opposite end portions 47, 50 of the feed roller 41. The first feed roller 41 (bottom right in FIG. 2) is called a butt lifter because it is configured to lift the sugarcane severed by the basecutter 16 into the throat of the feed section 18. The crop engagers 46 of the butt lifter comprise a number of bars (e.g., four) spaced evenly about and mounted to the two shorter drums 44 (e.g., welded).

Regarding the other feed rollers 41 of the lower rank 39, the crop engagers 46 are configured as a number of axial rows of teeth spaced circumferentially evenly about the drums 44 and, with respect to the middle three feed rollers 41, having a non-uniform height profile and, with respect to the last feed roller 41 (top left of lower rank 39 in FIG. 2), having a uniform height profile. The non-uniform height profile may be somewhat V-shaped with the peak at the middle of the feed roller 41. Each row of teeth is included in a linear plate mounted to the two drums 44 (e.g., welded). For example, each feed roller 41 of the lower rank 39 may comprise a first linear plate comprising two diametrically opposite axial rows of teeth, a second linear plate comprising an axial row of teeth, and a third linear plate comprising an axial row of teeth diametrically opposite to the axial row of teeth of the second linear plate. The first linear plate comprises along its midline three slots arranged along the axis 42 of the roller 41, and each of the second and third plates comprises three tabs, each of which is received in a respective one of the slots, such that each of the second and third linear plates is fixed to the first linear plate (and one another) between the drums 44 (e.g., welded with tab-and-slot joints). In general, the crop engagers 46 of the feed rollers 41 may be configured in a wide variety of ways to advance the sugarcane through the feed section 18 to the chopping section 20.

Each feed roller 41 is mounted for rotation about its axis 42. The feed roller 41 is so mounted at opposite end portions 47, 50 of the feed roller 41.

The end portion 47 comprises a wall (e.g., a disk) and a shaft. With respect to the feed roller 41 with the single drum 44, the wall is an internal wall positioned within and fixed (e.g., welded) to the drum 44. With respect to the feed roller 41 with the dual drums 44, the wall is an end wall fixed (e.g., welded) to the respective drum 44. The shaft is fixed (e.g., bolted) to and extends axially outwardly from the wall relative to the axis 42. The shaft is received in a bearing (the interior of the cross-section of the bearing represented diagrammatically in FIGS. The bearing is received in and mounted to a housing. With respect to the lower rank 39 of structures 38, the housing is fixed (e.g., bolted with four bolts) to the frame 36, thereby mounting the end portion 47 of the roller 41 to the frame 36 for rotation relative thereto.

With respect to the upper rank 40 of structures 38, the housing is fixed (e.g., bolted with four bolts) to a first mounting plate 48 of a pivot frame 49 of the structure 38, the first mounting plate 49 being pivotally coupled to the frame 36. The end portion 47 of the roller 41 is thus mounted to the frame 36 with respect to both ranks 39, 40 of structures 38.

Figure 4:
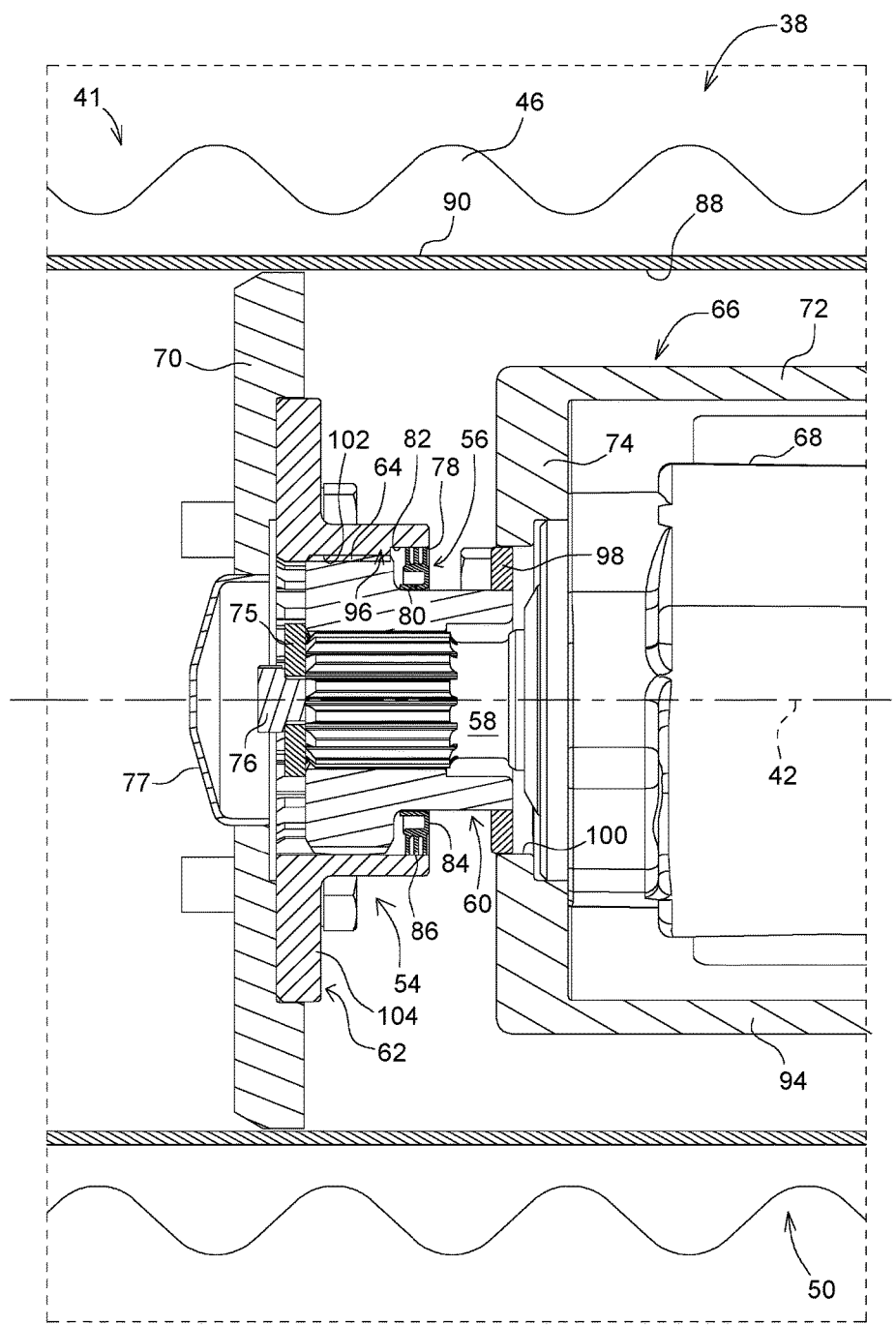
FIG. 4 is an enlarged sectional view of the region 4 of FIG. 3 showing a seal for a coupling.

Referring to FIGS. 3 and 4, at the end portion 50 of the feed roller 41, the structure 38 comprises a motor 52, a coupling 54, and a seal 56. As such, each structure 38 may be driven with a respective motor 52, which may be positioned on either side of the harvester 10. The motor 52 comprises a rotatable motor shaft 58. The coupling 54 comprises a shaft coupler 60 and a roller coupler 62. The shaft coupler 60 is fixed to the motor shaft 58 for rotation therewith. The roller coupler 62 is fixed to the feed roller 41. The shaft coupler 60 and the roller coupler 62 are arranged in splined engagement with one another so as to provide a splined joint 64 for rotation of the feed roller 41 by the motor 52. The seal 56 establishes a sealed connection between the shaft coupler 60 and the roller coupler 62 for protection of the splined joint 64.

The feed roller 41 comprises a wall 70 (e.g., disk). With respect to the feed roller 41 with the single drum 44, the wall 70 is an internal wall positioned within and fixed (e.g., welded) to the drum 44. With respect to the feed roller 41 with the dual drums 44, the wall is an end wall fixed (e.g., welded) to the respective drum 44. The roller coupler 62 is fixed to the internal wall 70 (e.g., bolted with four bolts).

The structure 38 comprises a housing 66. A motor body 68 of the motor 52 is fixed to the housing 66. A housing portion 72 of the housing 66 is positioned within the drum 44. The motor body 68 is positioned at least partially within the housing portion 72 and fixed to an axial end wall 74 of the housing portion 72 (e.g., bolted with two bolts). With respect to the lower rank 39 of structures 38, the housing 66 is fixed (e.g., bolted with four bolts) to the frame 36, thereby mounting the end portion 50 of the roller 41 to the frame 36 for rotation relative thereto. With respect to the upper rank 40 of structures 38, the housing 66 is fixed (e.g., bolted with four bolts) to a second mounting plate 51 of the pivot frame 49 of the structure 38, the second mounting plate 51 being pivotally coupled to the frame 36. A bar of the pivot frame 49 interconnects the first and second mounting plates 48, 51 respectively at the two end portions 47, 50. The end portion 50 of the roller 41 is thus mounted to the frame 36 with respect to both ranks 39, 40 of structures 38.

The shaft coupler 60 is fixed to the motor shaft 58. The shaft coupler 60 and the motor shaft 58 are arranged in splined engagement with one another. Axial movement between the shaft coupler 60 and the motor shaft 58 is blocked by, for example, a washer 75 that is fixed to an end face of the shaft coupler 60 (e.g., welded) and a bolt 76 that fastens the washer 75, and thus the shaft coupler 60, to the motor shaft 58 by threaded engagement therewith. A cap 77 covers the washer 75 and bolt 76 and is fixed (e.g., press-fitted) to the wall 70.

The shaft coupler 60 and the roller coupler 62 are respectively configured, for example, as a male member and a female member. As such, the shaft coupler 60 is positioned within the roller coupler 62 in splined engagement therewith.

The seal 56 is positioned radially between the shaft coupler 60 and the roller coupler 62 in a radial gap 78 relative to the axis of rotation 42 of the roller 41. The shaft coupler 60 and the roller coupler 62 cooperate to define the radial gap 78 therebetween.

The seal 56 establishes the sealed connection between an unsplined portion 80 of the shaft coupler 60 and an unsplined portion 82 of the roller coupler 62. The seal 56 is positioned in the radial gap 78 between and in contact with the unsplined portion 80 of the shaft coupler 60 and the unsplined portion 82 of the roller coupler 62.

The seal 56 is configured, for example, as a radial lip seal. Illustratively, the seal 56 has an annular base 84 having a C-shaped cross-section and contacting the unsplined portion 80 of the shaft coupler 60, and a number of annular lips 86 (e.g., three) projecting radially from the base 84 relative to the axis 42 into contact with the unsplined portion 82 of the roller coupler 62. The seal 56 is constructed, for example, with the base 84 made of metal and the lips 86 made of elastomeric material (generic hatching is used for the seal 56 in FIGS. 3 and 4). The seal 56 is depicted in its relaxed state, it being understood that, when in situ, the seal 56 would deflect accordingly.

The seal 56 protects the splined joint 64 from exposure and wear. The seal 56 is positioned in a passageway 88 extending between an exterior 90 of the roller 41 and the splined joint 64, which is positioned within the roller 41, to block ingress of debris (e.g., crop material, dirt, water, and contaminates in general) from the exterior 90 to the splined joint 64, for protection of the splined joint 64. The seal 56 retains lubricant (e.g., grease) that lubricates the splined joint 64 for protection of the splined joint 64 (e.g., resisting fretting corrosion). The passageway 74 includes the radial gap 78, in which the seal 56 is positioned.

The seal 56 is positioned within the drum 44 axially between the wall 70 and the housing portion 72 relative to the axis 42. Illustratively, the seal 56 is positioned axially between the internal wall 70 and the end wall 74 of the housing 66 relative to the axis 42. The end wall 74 is coupled to a cylindrical side wall 94 of the housing 66, and is positioned within the drum 44 so as to be included in the housing portion 72. As indicated herein, the motor body 68 is fixed to the end wall 74. The seal 56 is positioned axially between the splined joint 64 and the end wall 74 relative to the axis 42.

The seal 56 is positioned on the unsplined portion 80 of the shaft coupler 60 axially between a splined portion 96 of the shaft coupler 60 and an annular flange 98 of the structure 38 relative to the axis 42. The flange 98 is fixed to the unsplined portion 80 and projects radially outwardly therefrom to generally close an aperture 100 in the end wall 74 through which the motor shaft 58 extends, to block ingress of debris to the motor shaft 58. The aperture 100 is large enough to allow passage therethrough of the motor shaft 58, the shaft coupler 60 fixed to the motor shaft 58, and the flange 98 fixed to the shaft coupler 60 during assembly of the structure 38. The flange 98 is, for example, press-fitted onto the unsplined portion 80 of the shaft coupler 60.

The seal 56 is positioned in contact with the unsplined portion 82 of the roller coupler 62. A splined portion 102 of the roller coupler 62 is positioned axially between the unsplined portion 82 and an annular flange 104 of the roller coupler 62. The flange 104 is fixed to the wall 70 (e.g., bolted with four bolts).

Figure 5:
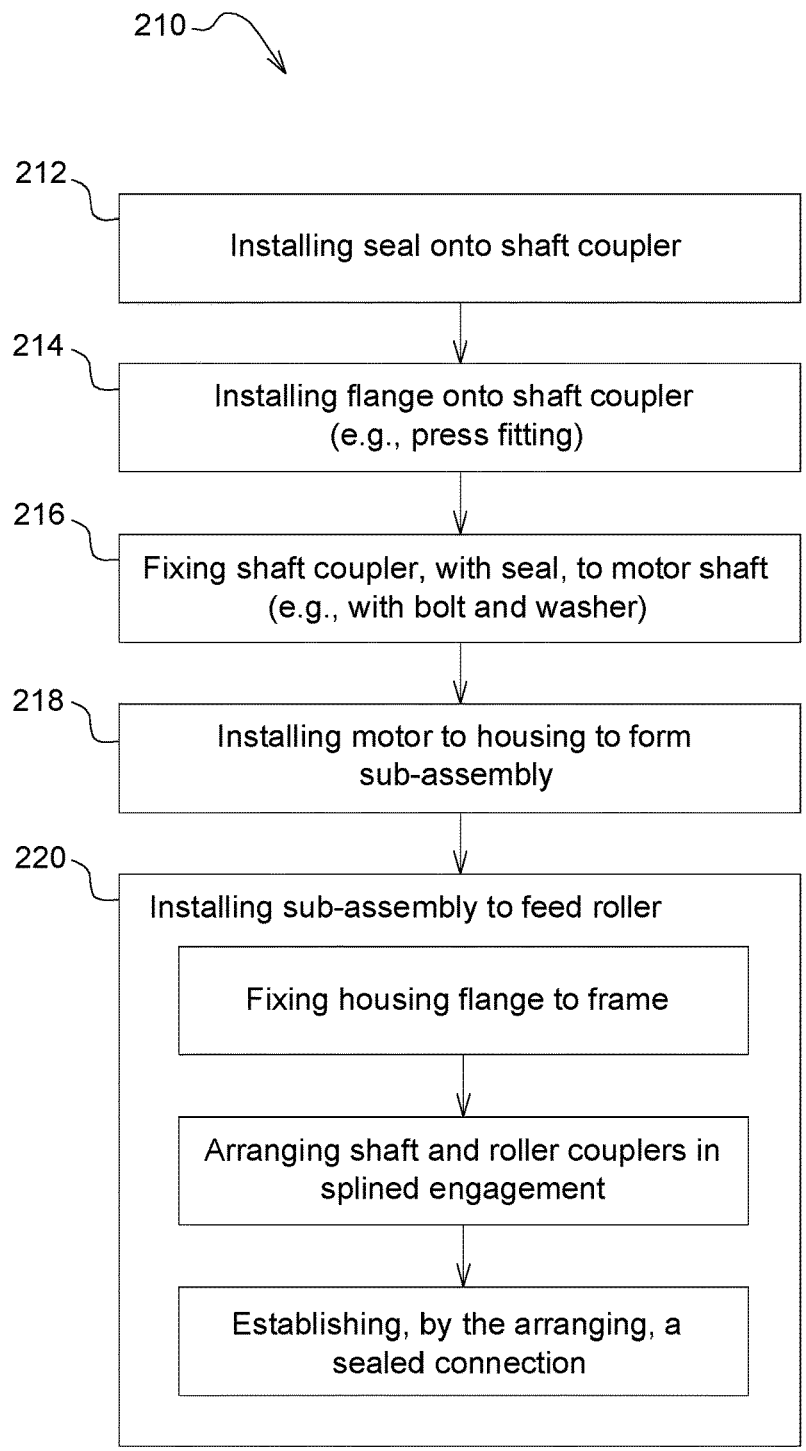
FIG. 5 is a diagrammatic view showing a method for assembling the sugarcane feed roller structure.

Referring to FIG. 5, a method 210 of assembling the structure 38 is shown. At box 212, the method 210 comprises installing the seal 56 onto the shaft coupler 60. A tool, such as, for example, a first knocker, may be used to install the seal 56 onto the shaft coupler 60.

At box 214, the method 210 comprises installing the flange 98 onto the shaft coupler 60 after installing the seal 56 on the shaft coupler 60 but before fixing the shaft coupler 60 to the motor shaft 58 at box 216. Installing the flange 98 comprises press-fitting the flange 98 onto the shaft coupler 60. A tool, such as, for example, a second knocker, may be used to press-fit the flange 98 onto the shaft coupler 60. In other embodiments, installing the flange 98 may comprise welding the flange 98 onto the shaft coupler 60.

At box 216, the method 210 comprises fixing the shaft coupler 60, with the seal 56 installed thereon, to the motor shaft 58. Fixing the shaft coupler 60 to the motor shaft 58 comprises fixing the shaft coupler 60 to the motor shaft 58 with the bolt 76 and washer 75.

At box 218, the method 210 comprises installing the motor 52 to the housing 66 to form a sub-assembly. This installing comprises fixing the motor body 68 to the end wall 74 (e.g., bolting with two bolts).

At box 220, the method 210 comprises installing the sub-assembly to the roller 41. This installing comprises fixing (e.g., bolting with four bolts) a flange of the housing 66 to the frame 36 when the structure 38 is part of the lower rank 39 of structures 38 and to the second mounting plate 51 of the respective pivot frame 49 when the structure 38 is part of the upper rank 40 of structures 38. This installing comprises arranging the shaft coupler 60 and the roller coupler 62, fixed to the feed roller 41, in splined engagement with one another so as to provide the splined joint 64 for rotation of the roller 41 by the motor 52. At box 220, the method 210 comprises establishing, by the arranging, a sealed connection between the shaft coupler 60 and the roller coupler 62 with the seal 56 for protection of the splined joint 64.

The structure 38 may be initially constructed with the seal 56 according to the aforementioned acts of the method 210. In other embodiments, the structure 38 may have been constructed without the seal 56, in which case the structure 38 may be retrofitted to include the seal 56. In such a case, the method 210 comprises removing the sub-assembly from the roller 41 and then removing the motor 52 from the housing 66. The structure 38 may have been initially constructed with a shaft coupler having a different configuration, namely, with the flange 98 being one-piece with the shaft coupler. In such a case, the method 210 comprises discarding that flanged shaft coupler and replacing it with the shaft coupler 60 for use in the assembly method 210. Otherwise, the method 210 may follow the acts disclosed herein during a retrofitting operation.

The method 210 may be performed by use of common hand tools and the first and second knockers.

As used herein, the phrase A is fixed to B means that A is connected to B against movement relative to B.

Welds and threads are not shown in the drawings for ease of illustration, but their presence is to be understood.

While the disclosure has been illustrated and described in detail in the drawings and foregoing description, such illustration and description is to be considered as an example and not restrictive in character, it being understood that an illustrative embodiment has been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the appended claims.

What is claimed is:

1. A sugarcane feed roller structure, comprising:
   a sugarcane feed roller, a motor comprising a rotatable motor shaft, a coupling comprising a shaft coupler and a roller coupler, the shaft coupler fixed to the motor shaft for rotation therewith, the roller coupler fixed to the sugarcane feed roller, the shaft coupler and the roller coupler arranged in splined engagement with one another so as to provide a splined joint for rotation of the sugarcane feed roller by the motor, and a seal establishing a sealed connection between the shaft coupler and the roller coupler for protection of the splined joint, wherein each of the shaft coupler and the roller coupler comprises an unsplined portion, and the seal establishes the sealed connection between the unsplined portion of the shaft coupler and the unsplined portion of the roller coupler.

2. The sugarcane feed roller structure of claim 1, wherein the seal is positioned in a radial gap between and in contact with the unsplined portion of the shaft coupler and the unsplined portion of the roller coupler relative to an axis of rotation of the sugarcane feed roller.

3. The sugarcane feed roller structure of claim 2, comprising a flange fixed to the shaft coupler, wherein the shaft coupler comprises a splined portion, and the seal is positioned axially between the splined portion and the flange relative to the axis of rotation.

4. The sugarcane feed roller structure of claim 2, wherein the roller coupler comprises a flange fixed to the feed roller and a splined portion positioned axially between the unsplined portion of the roller coupler and the flange relative to the axis of rotation.

5. A sugarcane feed roller structure, comprising:
a sugarcane feed roller,
a motor comprising a rotatable motor shaft,
a coupling comprising a shaft coupler and a roller coupler, the shaft coupler fixed to the motor shaft for rotation therewith, the roller coupler fixed to the sugarcane feed roller, the shaft coupler and the roller coupler arranged in splined engagement with one another so as to provide a splined joint for rotation of the sugarcane feed roller by the motor, and a seal establishing a sealed connection between the shaft coupler and the roller coupler for protection of the splined joint, and a housing, wherein the motor comprises a motor body fixed to the housing, the sugarcane feed roller comprises a drum and a wall fixed to the drum, the roller coupler is fixed to the wall, the housing comprises a housing portion positioned within the drum, the motor body is positioned at least partially within the housing portion, and the seal is positioned within the drum axially between the wall and the housing portion relative to an axis of rotation of the sugarcane feed roller.

6. A method, comprising
installing a seal onto a shaft coupler,
fixing the shaft coupler with the seal installed thereon to a motor shaft of a motor,
arranging the shaft coupler and a roller coupler, fixed to a sugarcane feed roller, in splined engagement with one another so as to provide a splined joint for rotation of the sugarcane feed roller by the motor, and
establishing, by the arranging, a sealed connection between the shaft coupler and the roller coupler with the seal for protection of the splined joint.

7. The method of claim 6, comprising installing a flange onto the shaft coupler after installing the seal onto the shaft coupler but before fixing the shaft coupler to the motor shaft.

8. The method of claim 7, wherein installing the flange onto the shaft coupler comprises press-fitting the flange onto the shaft coupler.

* * * * *